March 14, 1944.  H. W. EDEN  2,344,032
COMPRESSION COUPLING
Filed Nov. 26, 1941
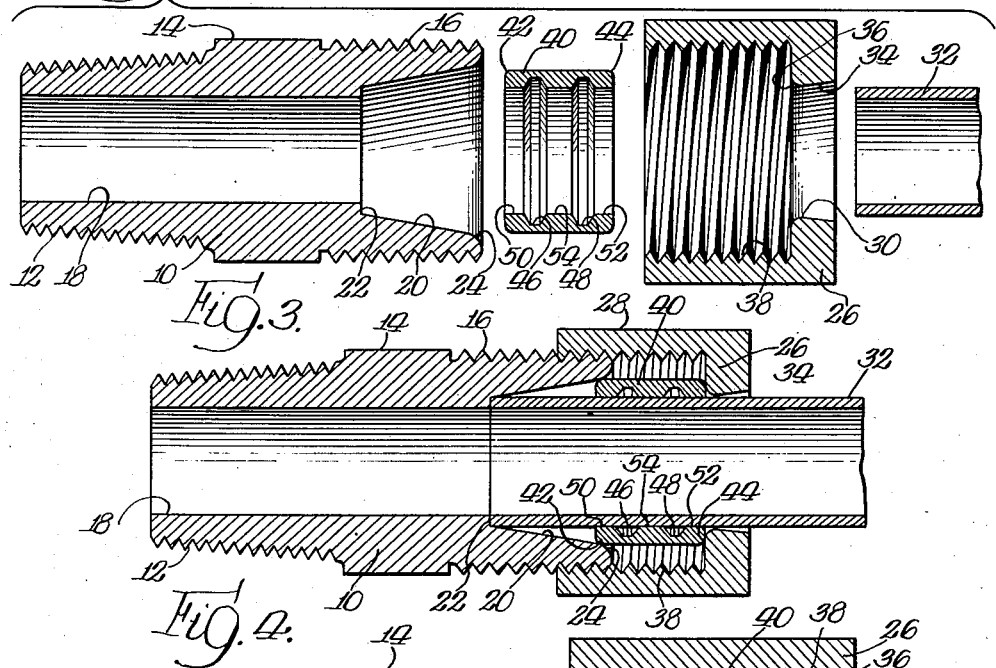
Inventor:-
Harold W. Eden.
BY Bair & Freeman Attys.

Patented Mar. 14, 1944

2,344,032

UNITED STATES PATENT OFFICE 2,344,032

COMPRESSION COUPLING

Harold W. Eden, Chicago, Ill., assignor to The Imperial Brass Manufacturing Company, Chicago, Ill., a corporation of Illinois Application November 26, 1941, Serial No. 420,481

3 Claims. (Cl. 285—86)

My invention relates to couplings and particularly couplings of the kind which are ordinarily used for making connections on relatively thin-walled tubing.

Among the objects of my invention is to provide a new and improved coupling which makes a tightly sealed connection for relatively thin-walled tubing capable of remaining sealed under excessive vibration and relatively high pressures.

Another object of my invention is to provide a new and improved coupling wherein parts of the coupling are threaded together and in which the threaded parts are pressed into forced engagement with each other during the make up of the coupling so that they may not become unthreaded when the coupling is subjected to excessive vibrations.

Still another object of my invention is to provide a new and improved coupling having a sealing sleeve cooperating with the coupling parts in such a manner that the sleeve is forced into more intimate contact with the tube at one end than the other, thereby providing a graduated pressure engagement so as to eliminate the usual sharp line of demarcation between the clamped portion of the tube and the remaining free portion of the tube which is most susceptible to deflection and movement under vibration.

Also among the objects of my invention is to build such a coupling so that it can be repeatedly made and remade without sacrificing the sealing properties of the coupling.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 shows a side elevational view of the coupling when made up;

Figure 2 is an exploded view showing the parts of the coupling in section;

Figure 3 is a longitudinal sectional view of the parts of the coupling connected together prior to being forced into sealing relationship; and Figure 4 is a longitudinal sectional view of the parts of the coupling drawn to a slightly larger scale showing the relative position of the parts when the coupling has been completely made.

Although many couplings have been provided in the past for connecting thin-walled tubing such as copper, aluminum and thin-walled steel tubing, these couplings seldom had to take into consideration excessive vibration frequently extending over a long period of time. Although couplings of the sort heretofore devised have been successful in producing a relatively leak-proof joint under average circumstances, their success has been limited to installations such as refrigerators, automobiles, illuminating gas and locations either where pressures have not been excessive or where vibration, when present, has not been extremely severe.

Owing to the increased use of steel tubing which replaces the more or less soft-walled copper and aluminum tubing, especially where high pressures are to be carried or where the installation must be extremely rugged, a coupling capable of holding steel tubing must be used. The steel tubing now currently manufactured is of two types. One type consists of a drawn type of tube where the wall is relatively thin and homogeneous throughout. Another type is of the rolled construction, frequently known commercially as "Bundy" tubing. Bundy tubing in particular, consists of a tube made up of a thin sheet rolled up and welded together. Tubing of this kind presents difficulties when used with fittings originally intended for copper and aluminum tubing of the style employed on airplane engines, tank motors or the like. In the latter two fields of use particularly, increase in the size and power of the engine adds appreciably to the vibration and excessive vibration must be taken into consideration when a coupling is constructed for making joints in the tubing.

To provide a suitable coupling for rugged use where vibration is excessive, the present invention contemplates coupling parts of rather special design including a separate sleeve. In the embodiment of the invention chosen for the purpose of illustration, there is provided a body 10 having a pipe thread 12 at one side and a hexagonal portion 14 midway between the ends to provide a wrench hold. The body on the opposite side of the hexagonal portion has external threads 16. A passage 18 extends through the center of the body and has a diameter substantially equal to the inside diameter of the tube to be coupled. At the end of the body adjacent the threads 16 there is provided a recess 20 flared outwardly toward the end so as to assume the shape of a truncated cone. The top of the truncated cone has a greater diameter than the passage 18 and forms a step 22. The bottom of the cone has a rounded portion 24. Although the angle of the cone is not critical nevertheless it has been found in practice that an included angle between opposite sides of the cone is most satisfactory when made not less than 5° and not greater than 20°.

A nut 26 also has a hexagonal portion 28 to provide a wrench hold and at the outside end is provided with a passage 30 slightly larger in diameter than the outside diameter of a tube 32 which is designed to be held by the coupling. The passage 30 has an outwardly expanded portion 34 on the outside end of the nut and a rounded annular shoulder 36 at the inside end. Inside the nut is a pocket 38 threaded internally so that the threads may engage the threads 16 on the body.

In order to effect sealing there is provided a sleeve 40 having a relatively cylindrical outside wall with rounded ends 42 and 44. There is a passage through the sleeve slightly larger in diameter than the outside diameter of the tube 32 so that the sleeve may slide freely over the tube as shown in Figure 3. The wall of the passage in the sleeve is provided with two annular depressions 46 and 48, forming outside ribs 50 and 52, respectively, and a center rib 54. It will be noted that the outside diameter of the sleeve is slightly less than the diameter of the bottom 24 of the truncated conical recess 20 so that the sleeve may enter partly into the recess before the coupling is made tight, as will become apparent on examination of Figure 3. The wall of the sleeve is made thick enough so that its opposite end may engage the rounded shoulder 36. It is to be noted that the most advantageous form of sleeve is one having two annular depressions forming three ribs spaced one from another.

In operation the tube 32 is squared off at the end and the nut 26 slid over the end of the tube. Next, the sleeve 40 is slid over the tube and the end of the tube inserted into the recess 20 until it comes into contact with the step 22 at the bottom of the recess. When this has been accomplished, the nut is slid into contact with the body and one or two threads are made to engage as shown in Figure 3. Up to this time, no pressure is exerted endwise upon the sleeve.

Next, the nut 26 is threaded upon the body and the rounded shoulder 36 gradually pushes the sleeve into the truncated conical recess 20 until it occupies the position shown in Figure 4. It is to be noted that because of the sloping surface of the recess wall, the rib 50 will be distorted and forced into the tube to a relatively substantial depth, whereas the central rib 54, though being distorted to some extent, is forced into the wall of the tube to a lesser depth.

The extent to which the sleeve is forced into the tube is slightly exaggerated in Figure 4 so that the relative distortion can be more readily observed. It is further to be noted that the rib 52 although forced into surface contact with the outside wall of the tube is not driven inwardly with such force to depress the wall of the tube. When the coupling has been completed as above described and as shown in Figure 4, the sleeve will be anchored in gas-tight contact with the outside wall of the tube. The outer surface of the sleeve will have a gas-tight contact with the wall of the pocket 20. In addition, the rounded shoulder 36 will have a sealing contact with the adjacent end of the sleeve. It is significant further that by reason of the fact that the wall of the pocket 20 is sloping, when the sleeve is driven into it there is a tendency to spread the wall at the outside end of the pocket a slight amount. As the wall of the pocket 20 is spread slightly the threads 16 are forced into a sealing contact with the threaded interior of the pocket 38. There is accordingly a double seal effected between the passage within the coupling and the atmosphere.

When it is desired to unmake and remake the coupling, it usually becomes necessary to unscrew the nut with a wrench because of the sealing contact of threads with each other. As the coupling is unmade, pressure on the sleeve is relieved and when the nut is separated from the body, the outside wall of the recess 20 is returned to substantially its initial shape and the sleeve and attached tube can be readily drawn without any binding taking place. Once the sleeve is applied to the tubing, it will no longer rotate relative to the tube but will maintain its fixed sealing contact. On remaking the coupling, the tube and sleeve will be inserted into the pocket 20 and the nut reapplied. The nut will then normally be drawn up to the position shown in Figure 4 and then a slight additional force added in order to be certain that the sealing is complete. As the coupling is remade a great number of times, there may be a slight tendency for the depressions in the tube beneath the respective ribs 50 and 54 to merge with each other but this in no way detracts from the tightly sealed relationship of the parts.

Greatest pressure on a coupling of this kind will be at the innermost end of the sleeve adjacent the rib 50 and pressure will be correspondingly less at the outermost end where the rib 52 is in contact with the tube. Important also is the fact that the passage 30 in the nut is flared outwardly as at 34. When the tube or the coupling is subjected to vibration, there will be a tendency of the tube to flex slightly. This is allowed for in the expanded portion of the passage 30. It is further allowed for in providing a graduated pressure between the sleeve and the tube. The outer end of the sleeve being only in relatively light contact with the tube will permit a slight deflection under vibration which is gradually eliminated as the effect passes to the inside of the sleeve. There is, therefore, no marked concentration of vibration at any part of the tube and the tendency to rupture due to fatigue is substantially minimized.

By providing a sleeve having ribs of the sort shown and described, no matter how great a pressure is applied, the sleeve will never actually cut into the tubing even though it might be of a softer metal than the sleeve itself. Consequently, where tubing is of the rolled type wherein the rolls are of relative thin metal, there will be no skinning off of the outermost layer on the tube which would otherwise weaken the coupling joint. The coupling forms a firm grip so that no amount of tension or pull between the tube and the coupling will break the joint. By having a certain amount of flexibility built into the joint, it has been found that excessive and prolonged vibration will not fracture the tube at the joint.

Furthermore, by reason of the fact that when made up the sleeve is in effect frozen to the tube, the nut will rotate about the tube and sleeve so that the tube is not rotated during making. The sliding contact will be between the rounded shoulder 36 and the adjacent end of the sleeve. This function is important especially when a coupling of this sort is to be made on opposite ends of a tubing line since after the first coupling is made up the tube must not rotate while the second coupling is applied or else it will twist and become substantially weakened throughout the length between the coupling joints.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A coupling for relatively thin walled substantially rigid tubing adapted to be made and remade comprising a body, a sleeve, and a nut adapted to be threadably attached to the body, said body having a passage therethrough and an annular enlargement at one end of the passage having the wall thereof flared outwardly providing a recess substantially wedge shaped in cross section between the wall of the tubing and said wall of the enlargement, said nut having a passage therethrough for the tubing including a recess at one end and an abutment at the bottom of the recess, said sleeve comprising a single ring of metal circumferentially continuous throughout its width and having a plurality of open annular depressions in the inner wall thereof surrounding the tube, one end of said sleeve being smaller than the large end of said annular enlargement on the body and the other end being larger than the adjacent end of the passage through the nut, said sleeve having an initial position with the end only of said sleeve extending into the enlargement and an assembled position wherein the sleeve has a position closer to the bottom of the enlargement said sleeve being displaced axially relative to the initial position thereof and wherein the tubing is in snug contact with the bottom of the enlargement, said sleeve throughout its length having a portion deflected into the wall of the tubing, said deflection being greater at the end of the enlargement nearest the end of the tube than at the other end.

2. A coupling for thin-walled tubing adapted to be repeatedly made and remade comprising a body member and a nut member, one of said members having a passage therethrough expanded outwardly at one end thereof, the other member comprising a threaded portion engaging a correspondingly threaded portion of the first member and having a passage therethrough substantially larger in diameter than the outside diameter of the tubing, said threaded portion forming a pocket in said other member and an annular shoulder at the bottom of the pocket, and a sleeve having on the inside wall thereof a plurality of spaced annular depressions forming ribs surrounding the tube, said sleeve when in coupled relationship with said nut and body members having a position wherein one end is under endwise pressure against the shoulder on said other member and wherein the body of the sleeve is forced within the outwardly expanded end of the passage in said first member, the annular rib at the end of the recess adjacent the end of the tube being pressed into the tube wall forming a relatively deep annular depression therein and the annular ribs more remote from the end of the tube being pressed into the tube wall progressively lesser distances.

3. A coupling for thin-walled tubing adapted to be repeatedly made and remade comprising a body having a passage therethrough, one end of the passage being expanded laterally and outwardly in the form of a truncated conical recess and an annular step at the bottom of the recess extending between the wall of the recess and the wall of said passage, a threaded portion on the body outside said recess, a nut comprising a threaded pocket engaging the body and having a relatively short passage therethrough substantially larger in diameter than the outside diameter of the tubing and an annular shoulder at the bottom of the pocket, and a single piece sleeve having initially an unbroken exterior circumference throughout its width, the inside wall of said sleeve having a pair of spaced annular depressions positioned inwardly from the ends forming three continuous ribs, one at the center and one at each end, said sleeve when in completed coupling relationship with the body and nut having a position wherein one end is pressed axially against the shoulder on the nut and wherein the body of the sleeve is wedged in a space formed between the tubing and the truncated conical wall of the recess in said body, the innermost rib being pressed into the tube wall adjacent the free end thereof forming a relatively deep annular depression in said wall, the center rib being pressed a lesser distance into the tube wall at a location more remote from the free end of the tube and the rib at the other end being pressed into surface contact with the tube wall at a location most remote from the free end of the tube.

HAROLD W. EDEN.